United States Patent [19]

Lewis

[11] Patent Number: 5,355,472
[45] Date of Patent: Oct. 11, 1994

[54] SYSTEM FOR SUBSTITUTING TAGS FOR NON-EDITABLE DATA SETS IN HYPERTEXT DOCUMENTS AND UPDATING WEB FILES CONTAINING LINKS BETWEEN DATA SETS CORRESPONDING TO CHANGES MADE TO THE TAGS

[75] Inventor: Jonathon R. T. Lewis, Winchester, England

[73] Assignee: International Business Machines Corporation, Armonk, N.Y.

[21] Appl. No.: 615,769

[22] Filed: Nov. 19, 1990

[30] Foreign Application Priority Data

Apr. 19, 1990 [GB] United Kingdom ............ 90303870.1

[51] Int. Cl.⁵ ............................................. G06F 15/40
[52] U.S. Cl. ................................ 395/600; 364/DIG. 1; 364/286; 364/282.1; 364/225.6; 364/225.8; 364/419.1; 395/500; 395/700
[58] Field of Search ............... 395/600, 500, 425, 700; 364/419

[56] References Cited

U.S. PATENT DOCUMENTS

| | | | |
|---|---|---|---|
| 3,930,237 | 12/1975 | Villers | 340/172.5 |
| 4,445,795 | 5/1984 | Levine et al. | 400/63 |
| 4,633,430 | 12/1986 | Cooper | 364/900 |
| 4,982,344 | 1/1991 | Jordan | 364/521 |
| 5,047,918 | 9/1991 | Schwartz et al. | 364/200 |
| 5,144,555 | 9/1992 | Takadachi et al. | 395/600 |
| 5,159,669 | 10/1992 | Trigg et al. | 395/775 |

Primary Examiner—Thomas C. Lee
Assistant Examiner—Peter Y. Wang
Attorney, Agent, or Firm—Mark S. 23lker; Wayne P. Bailey

[57] ABSTRACT

A hypertext data processing system wherein data sets participating in the hypertext document may be edited, the data processing system inserting tags into the data sets at locations corresponding to the hypertext links to create a file which is editable by an editor and the data processing system removing the tags, generating a revised data set and updating the link information after the editing process.

14 Claims, 2 Drawing Sheets

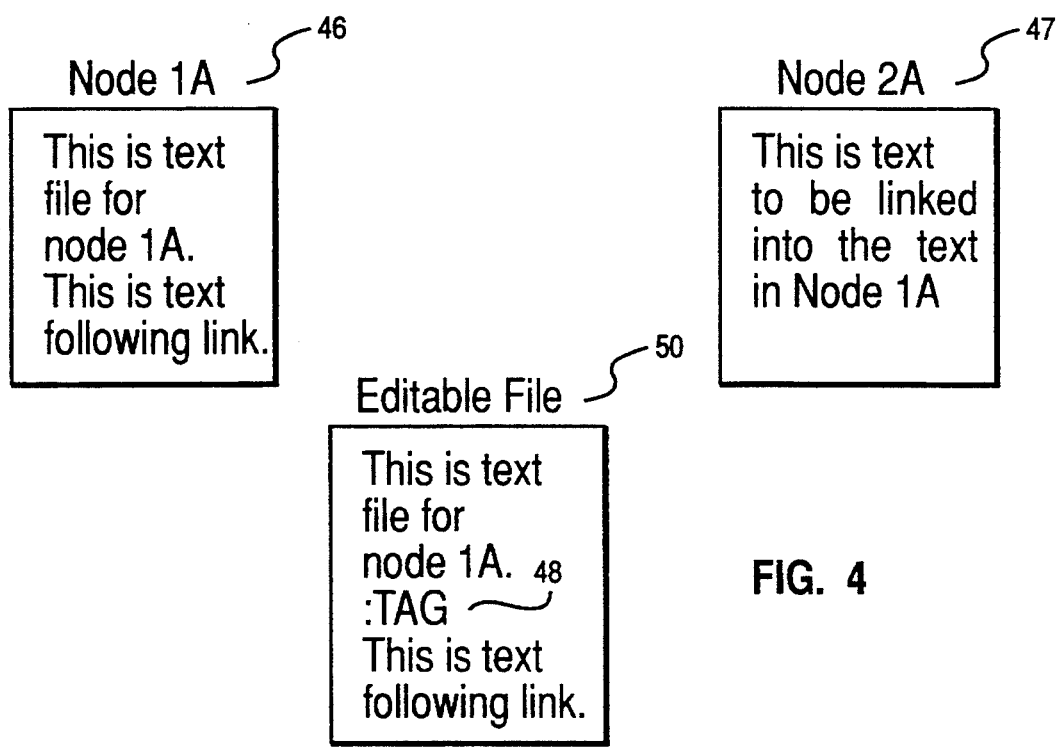

SYSTEM FOR SUBSTITUTING TAGS FOR NON-EDITABLE DATA SETS IN HYPERTEXT DOCUMENTS AND UPDATING WEB FILES CONTAINING LINKS BETWEEN DATA SETS CORRESPONDING TO CHANGES MADE TO THE TAGS

DESCRIPTION

1. Field of the Invention

The invention relates to a hypertext data processing system wherein data sets may be edited.

2. Background Art

Hypertext is a term used to describe a particular organization of information within a data processing system and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information or sound information, which can vary in size. A collection of such units of information is termed a hypertext document. Sometimes hypertext documents employing information other than text are termed hypermedia documents.

Each of the different units is essentially self-contained but may contain references to other units. Indeed, such references are the norm rather than the exception in a hypertext document. The references are made explicit in the form of "links". A link is a user-activated control. It causes the particular unit which is the link target to be displayed. Normally hypertext systems are window-based and the newly displayed unit appears in a new window. The new unit mays of course contain further links. By following links the user "navigates" around the document. The user has a great deal of control over the order in which information is presented and can play a very active role in selecting what is of interest and how far to pursue a given topic.

A hypertext document essentially consists of a group of individual units of information or "nodes" connected by links. Each link is a relation between two units of information. Data in the relation includes the location in the first unit where the link starts and the location in the second unit which is the target. Such location information may be stored in various forms, for example it may be in the form of byte offsets indicating the number of bytes from the start of the file.

It has been shown that it is advantageous for several reasons not to store the link information and the unit information in the same data files but to keep them separately. In particular, it allows different users to have different ways of linking the same documents. It means that users can be allowed to extend standard sets of links by adding their own links to new documents. Further, it is possible to display the relationships between the units of information as a graphic map of the information.

The set of links for a given view of the hypertext document is shown at 42 of FIG. 4 and known as a "web". An advantageous way to implement a hypertext document is to use a different file for each unit and to hold the web externally to the data sets in a relational database, such as Structured Query Language (SQL). Each unit of information connected by the links has a unique identifier. Links are stored in a SQL table. Each link (43 of FIG. 4) is an entry in the table and contains, amongst other things, the identifiers (44 and 45 of FIG. 4) of the nodes (46 and 47 of FIG. 4) which it connects. It is easy to discover, for example, all the links which connect to a particular node. The link table is searched for any entry which has either of its node identifiers equal to the node in question. SQL makes this kind of search easy to implement. Searches like this are very important for the hypertext system which must frequently query the relationship between nodes and associated links.

Creating the links between existing units of information is a relatively straightforward operation and is normally carried out by a computer program dedicated to the purpose which has a suitable user interface. However, a problem arises when a unit, which is part of a hypertext document, must be edited. The editing process may invalidate the externally held links by changing the byte offsets within the file. Worse, whole chunks of data which are link targets may be deleted from the file.

One solution to the problem is to provide an editing program specifically to handle the particular type of hypertext documents involved, the editor including means for keeping an ongoing record of the links and any changes made to them. An example of such 'closed' hypertext systems already in existence is known as "intermedia" and is described in ACM SIGPLAN Note 21, 11 (1986) pp 186–201. In this hypertext system the links are kept externally to the data sets, in a SQL database. Such "closed" systems have dedicated editors, ("InterText", "InterPix" and "InterDraw" in the case of "Intermedia") and the elements of the hypertext may only be edited using these dedicated means. The editors understand the external link information and maintain it explicitly during the editing process.

There are, however, already many general purpose editors in existence for the different types of data sets which may participate in a hypertext document. However these general purpose editors were not signed with hypertext in mind. Thus data sets participating in hypertext documents cannot be edited reliably using conventional general purpose editors.

SUMMARY OF THE INVENTION

The object of the invention is therefore to provide an "open" hypertext system wherein these editors may be used.

Accordingly there is provided by the present invention a hypertext data processing system comprising storage means for the storage of a plurality of data sets and a web file defining at least one hypertext link between specified locations in said data sets, logic for inspecting the web file to extract information identifying locations in a selected data set corresponding to hypertext links, logic for generating an editable file incorporating the contents of the selected data set and tags at the identified locations of the selected data set, which tags are indicative of the correspondence of the identified location with a hypertext link, means for editing the editable file, logic for removing the tags from the editable file and generating an output data set in accordance with changes made to the contents of the selected data set during the editing process.

The invention provides a hypertext data processing system which employs a simple method of preserving hypertext links during an editing operation by creating an editable file including hypertext link information in the form of tags which enables a conventional editor to be used as the editing means.

It is an advantage of the invention that the only times the data processing system needs to access the link information in the web file are during loading of the file from the disk and saving of the file to the disk storage after modification.

According to a preferred feature of the invention the hypertext data processing system further comprises means for updating the web file information in accordance with changes made to the locations of the tags during the editing process.

According to a preferred feature of the invention the means for updating the web file information generates an updated web file. As part of the process of saving the edited data set a new version of the web file is created which incorporates the changes to the links made during the editing process.

According to an alternative preferred feature of the invention the means for updating the web file information modifies the web file. As part of the process of saving the edited data set the tags are removed and the link information in the externally held web file is amended.

According to another preferred feature of the invention the editing means includes means for auto saving a copy of the editable file, thus allowing the current state of the edit to be stored to aid recovery in the event of an error or to assist in undoing changes which the user later deems inappropriate.

According to another preferred feature of the invention each tag contains a reference to an entry IN a table, which entry in the table contains supplementary information regarding the hypertext link to which the location of the tag corresponds, thus allowing the tags to be kept as short as possible.

According to another preferred feature of the invention the particular data set is a text file and the tags are a sequence of characters the first of which is a character of a particular type, whose purpose is to identify the sequence of characters as being a tag. This allows the tags to be distinguished from the rest of the data set.

A specific embodiment of the invention will be described below with reference to the following figures wherein,

BRIEF DESCRIPTION OF THE DRAWING

FIG. 4 depicts the web file, node files, and edible file.

FIG. 5 depicts a web file with example offset values.

DESCRIPTION OF THE PREFERRED EMBODIMENT

Figure 1:
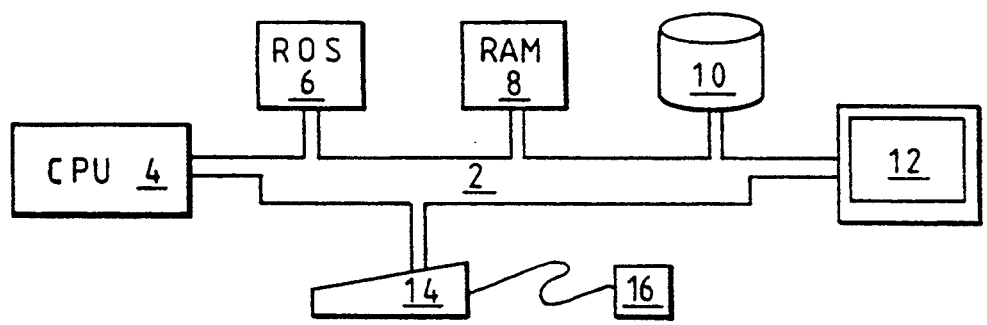
FIG. 1 shows a data processing system according to an embodiment of the present invention.

FIG. 1 is a block diagram of a data processing system according to an embodiment of the present invention. It shows a workstation consisting of a central processing unit (CPU) 4, a read only store (ROS) 6, a random access memory (RAM) 8, a disk drive for data storage 10, a display 12 and a user interface which may be a keyboard 14 and/or a mouse 16. These units are connected together by a system bus 2.

It should be noted that data processing system according to the invention could be of another type, such as a mainframe system and could be either a single-user or a multiple-user system.

In the embodiment of the invention the hypertext data sets may be edited using an editor which usually takes the form of a computer program, stored as a set of instructions in the disk storage 10. The editor could, however, be implemented using a dedicated electronic circuit or using programmable logic arrays or the like.

In the embodiment of the invention the hypertext document is assumed to be stored in the form of at least one data set stored in the disk storage 10, with the hypertext links stored in a SQL table also stored in the disk storage 10. For the sake of clarity we assume further the component data sets of the hypertext document to be text files, however it should be noted that the essential features of the invention would apply equally well to image or graphics data or indeed to any kind of data which may participate in a hypertext document and is capable of being edited. We also assume that the locations are stored in the form of byte offsets (490 of FIG. 4 and 5) from the start of the file, although it should again be noted that this is just one form in which the location information may be stored.

Figure 2:
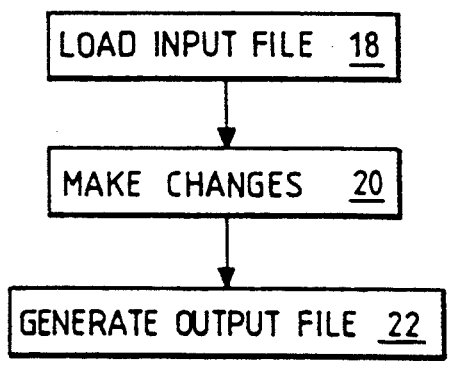
FIG. 2 is a flow diagram illustrating the operation of a conventional editor.

The operation of a conventional editor is illustrated by the flow diagram, FIG. 2. An input file is loaded (18) from the disk storage 10 into the RAM 8. The user is able to make changes (20) to the data in the RAM 8 and then, at the end of the editing process, an output file is generated (22) on the disk storage 10, the output file consisting of a copy of the input file incorporating any changes which have been made by the user.

Figure 3:
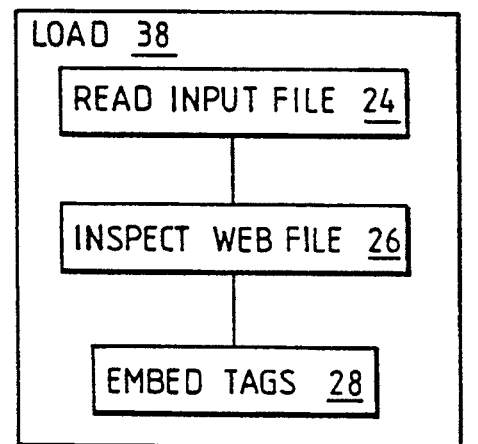
FIG. 3 is a flow diagram illustrating an editing operation according to the invention.
Figure 3:
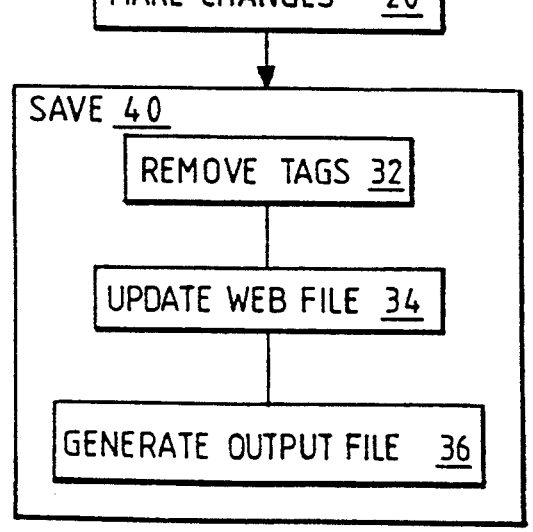

The operation of a data processing system according to an embodiment of the present invention is illustrated by the flow diagram, FIG. 3. The data processing system is made aware, as the input file is loaded (24), that the input file forms part of a hypertext document. This may be achieved in a number of ways. For example, prior to loading the file the data processing system may be able to inspect the web file to see if the file forms part of the hypertext document. Alternatively, some file systems allow attributes to be stored with files which may be, for example, contained in the header information. An attribute could be used to indicate to the editor that the file forms part of a hypertext document.

Having established that the text file (46) is part of a hypertext document, all the link sources and targets which are located in the file are looked up (26) from the web file and explicit link tags are embedded (28) at the appropriate points (48) in the text to form a file (50) which is then editable by the editor. Of course, as each tag is loaded, the offset information for the links not yet embedded will change as the file, in its form for editing will be longer than the form on disk which does not explicitly contain the tags. This is overcome by simply increasing the offsets by the length of the tag which has been inserted.

The precise form of the embedded tags which describe the links will depend on the nature of the editor. If the editor has some understanding of the context of the file the context definition may be expanded to include the tags. This may, for example, enable the editor to prevent the user from altering the contents of the tags, and thereby to ensure their integrity is maintained. If the editor is less sophisticated, some graphic escape characters might be used to surround the link information. The simplest form for the tags would be a string of text of a given length preceded by a character such as a colon or backslash, which is reserved for the purpose of characterizing the tags.

The three steps 24, 26 and 28 together form a "Load" stage, 38, prior to changes being made to the file by the user. The tags may be embedded into the file as a separate step after it has been read into the RAM 8 or during the reading process.

Once the tags have been embedded in the hypertext file, changes to the file may be made (20) by the user using the editor in the conventional way. The tags may be moved around and even deleted.

At the end of the editing process the tags are removed from the file (32) and an output file is generated, and the link information may be updated accordingly (34).

The three steps 32, 34, and 36 together form a "Save" stage, 40, after the user has finished making a set of changes. The tags may be removed as a separate step before the output file is generated or during the generation process.

Note that, once the tags have been added to the file, editing can continue in the usual way. No functional modifications are required to the editor itself. The only additional processing occurs during the loading (38) and the saving (40) of the file.

Many editors offer an autosave facility. This periodically saves the current state of the edit in a temporary file to aid recovery in the event of an error and also to assist in undoing changes which the user later deems inappropriate. The invention supports autosave in a simple form. Because the links are embedded in the file, when the editor performs autosave the state of the links may be preserved automatically by saving the file as a temporary autosave file without removing the tags. If the user decides to regress to a previous version of the file which has been autosaved, the link state is then automatically at the appropriate level.

It is advantageous if the information added to the file in the tags is kept to the minimum necessary to relate the position in the file to the particular link involved. This can be achieved by keeping the link reference information in a table separately from the file being edited; the tags in the file under edit referencing the table entries which contain the corresponding link information. The table entries do not change as the file is edited. Nor does the information in the link tag change as the file is modified. The normal operation of the editor is left unchanged. It is only when the editing operation is completed and the modified file saved that further action is taken.

It would be possible with some types of editors to prevent the user from modifying the contents of any of the link tags. However the user must be able to move, append or even delete text from the file. That may include deleting tags along with the text. If tags have been removed as a result of an editing operation, the structure of the hypertext document may have been disrupted. This is most likely to be the case when a link target has been deleted. When this happens there will be a dangling reference from somewhere else in the document. The system detects and deletes the dangling link.

It will be apparent to those skilled in the art that the deletion of the tags may be handled in many different ways, including creating different versions of the document being modified.

Although a particular example of the invention is described herein it will be appreciated that modifications and/or additions are possible within the scope of the invention. For example, in some cases the editor may provide programmable prologue and epilogue processing into which can be incorporated logic for the provision of the editable file including the link information. Alternatively the invention may be implemented by providing an editor with preprocessing and post-processing stages for the generation of an editable file.

I claim:

1. A method for editing one of a plurality of data sets interconnected by at least one web file containing link information for linking elements of the data sets, comprising:

storing, by a data processing system, a data set selected from the plurality of data sets of at least two different editable formats, and a web file;

extracting, by said data processing system, information identifying location in the selected data set, corresponding to locations identified by the link information, from the stored web file;

generating, by said data processing system, an editable file in an editable format incorporating contents of the selected data set and tags corresponding to the link information the tags being located at the extracted information identifying locations;

editing, by said data processing system, the editable file;

removing, by said data processing system, the tags from the editable file and generating an output data set in accordance with changes made to the contents of the editable file;

and updating, by said data processing system, the web file in accordance with changes made to the editable file tabs.

2. A method for editing data sets as claimed in claim 1 wherein updating the web file includes creating an updated web file.

3. A method for editing data sets as claimed in claim 1 wherein updating the web file includes modifying the web file.

4. A method for editing data sets as claimed in claim 1 wherein editing the editable file includes autosaving a copy of the editable file.

5. A method for editing data sets as claimed in claim 1 wherein the tag contains a reference to an entry in a table, the entry containing information regarding the ink to which the tag corresponds.

6. A method for editing data sets as claimed in claim 1 wherein the data set is a text file and the tags are a sequence of characters having a first particular type character whose purpose is to identify the sequence of characters as being a tag.

7. An apparatus for preprocessing one of a plurality data sets of at least two different editable formats interconnected by at least one web file containing link information for linking elements of the data sets, comprising:

storage means for storing a data set, selected from the plurality of data sets, and a web file;

extracting means, coupled to said storage means, for extracting information identifying locations in the selected data set, corresponding to locations identified by the link information, from the stored web file; and generating means, coupled to said extracting means, for generating an editable file in one of said editable formats incorporating contents of the selected data set and tags corresponding to the link information the tags being located at the extracted information identifying locations.

8. An apparatus for editing one of a plurality of data sets interconnected by at least one web file containing link information for the data sets, comprising:

storage means for storing a data set, selected from the plurality of data sets of least two different editable formats, and a web file;

extracting means, coupled to said storage means, for extracting information identifying locations in the selected data set, corresponding to locations identified by the link information, from the stored web file;

generating means, coupled to said extracting means, for generating an editable file in an editable format incorporating contents of the selected data set and tags corresponding to the link information the tags being located at the extracted information identifying locations;

editing means, coupled to said generating means, for editing the editable file;

removal means, coupled to said editing means, for removing the tags from the editable file and generating an output data set in accordance with changes made to the contents of the editable file;

and updating means, for updating the web file in accordance with changes made to the editable file tags.

9. An apparatus for editing data sets as claimed in claim 8 wherein the updating means creates an updated web file.

10. An apparatus for editing data sets as claimed in claim 9 wherein the updating means modifies the web file.

11. An apparatus for editing data sets as claimed in claim 8 wherein the editing means includes means for autosaving a copy of the editable file.

12. An apparatus for editing data sets as claimed in claim 8 wherein the tag containers a reference to an entry in a table, the entry containing information regarding the link to which the tag corresponds.

13. An apparatus for editing data sets as claimed in claim 9 wherein the data set is a text file and the tags are a sequence of characters having a first particular type character whose purpose is to identify the sequence of characters as being a tag.

14. An system for editing one of a plurality of data sets interconnected by at least one web file containing link information for linking elements of the data sets, comprising:

a central processing unit, coupled to said central processing unit;

a read only storage, coupled to said central processing unit;

a random access memory, coupled to said central processing unit;

a disk drive, coupled to said central processing unit;

interface means, coupled to central processing unit, for receiving input;

storage means, coupled to said central processing unit, for storing a data set selected from the plurality of data sets of at least two different editable formation, and a web file;

extracting means, coupled to said central processing unit, for extracting information identifying locations in the selected data set, corresponding to locations identified by the link information, from the stored web file;

generating means, coupled to said central processing unit, for generating an editable file incorporating contents of the selected data set and tags corresponding to the link information, the tags located at the extracted information identifying locations;

editing means, coupled to said central processing unit, for editing the editable file;

removal means, coupled to said central processing unit, for removing the tags from the editable file and generating an output data set in accordance with changes made to the contents of the editable file, and updating means, for updating the web file in accordance with changes made to the editable file tabs.

* * * * *